US011350332B2

(12) United States Patent
Quintuna Rodriguez et al.

(10) Patent No.: US 11,350,332 B2
(45) Date of Patent: May 31, 2022

(54) METHOD FOR TRANSFERRING A MOBILE TERMINAL BETWEEN ACCESS STATIONS IN A MULTI-OPERATOR CONTEXT

(71) Applicant: Orange, Paris (FR)

(72) Inventors: Veronica Karina Quintuna Rodriguez, Châtillon (FR); Gaël Fromentoux, Châtillon (FR); Xavier Marjou, Châtillon (FR)

(73) Assignee: ORANGE, Paris (FR)

( * ) Notice: Subject to any disclaimer, the term of this patent is extended or adjusted under 35 U.S.C. 154(b) by 108 days.

(21) Appl. No.: 16/753,716

(22) PCT Filed: Oct. 2, 2018

(86) PCT No.: PCT/FR2018/052427
§ 371 (c)(1),
(2) Date: Apr. 3, 2020

(87) PCT Pub. No.: WO2019/069013
PCT Pub. Date: Apr. 11, 2019

(65) Prior Publication Data
US 2020/0275338 A1    Aug. 27, 2020

(30) Foreign Application Priority Data
Oct. 5, 2017  (FR) ...................................... 1759353

(51) Int. Cl.
*H04W 4/00* (2018.01)
*H04W 36/30* (2009.01)
(Continued)

(52) U.S. Cl.
CPC ........... *H04W 36/30* (2013.01); *H04W 36/22* (2013.01); *H04W 36/32* (2013.01)

(58) Field of Classification Search
CPC ..... H04W 36/30; H04W 36/22; H04W 36/32; H04W 36/26; H04W 36/14
(Continued)

(56) References Cited

U.S. PATENT DOCUMENTS 6,725,041 B1 *  4/2004  Nakano ................. H04W 36/30
                                                           455/436
8,561,135 B2 * 10/2013  Upp ...................... H04L 9/3263
                                                           726/2
(Continued)

FOREIGN PATENT DOCUMENTS

EP     1 434 456 A2    6/2004
EP     2 866 497 A1    4/2015

OTHER PUBLICATIONS

International Search Report and Written Opinion dated Dec. 6, 2018 for Application No. PCT/FR2018/052427.

*Primary Examiner* — Amancio Gonzalez
(74) *Attorney, Agent, or Firm* — Knobbe, Martens, Olson & Bear, LLP

(57) ABSTRACT

A method is provided for transferring a mobile terminal attached to a first access entity of an operator to a second access entity of a set of access entities controlled by at least one other operator within a communication network, the method implemented by a control device for routing data of the terminal. The method includes receiving, a connectivity message from entities of the set, determining an eligibility value relative to each entity based on at least one received parameter and a cooperation factor between the first entity and each other entity, selecting the second entity on the basis of the determined eligibility value, transmitting a transfer message to the first entity and to the second entity.

14 Claims, 5 Drawing Sheets

Figure 1:
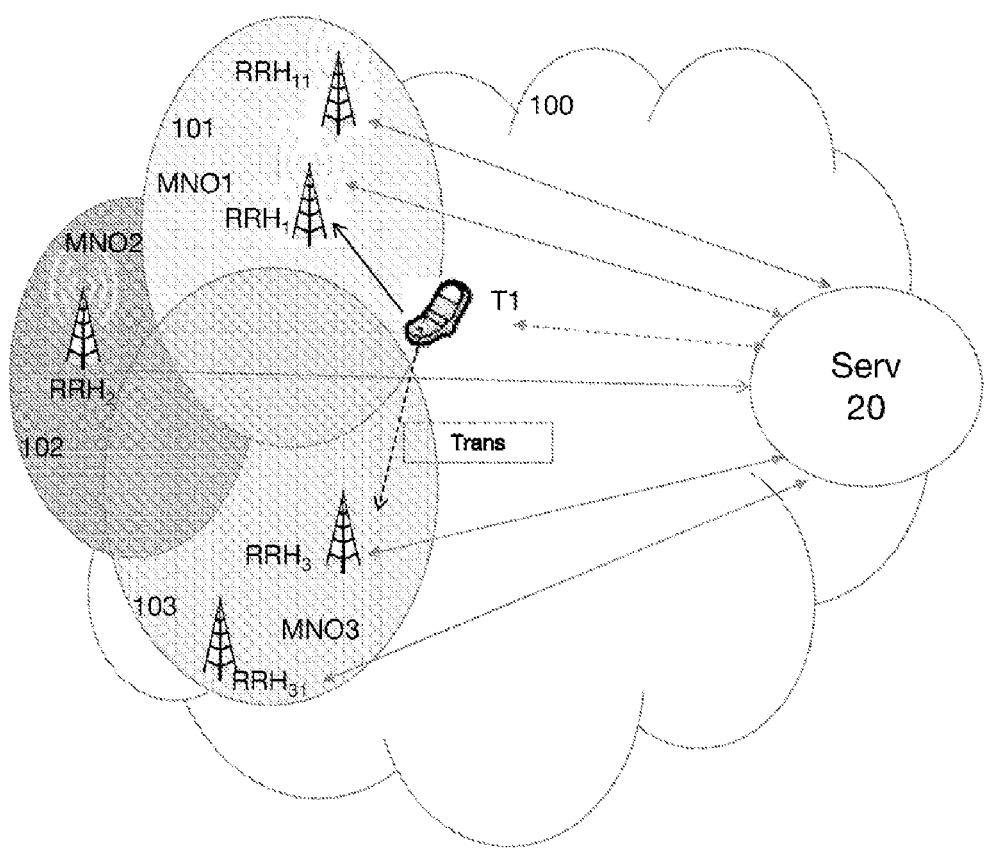

(51) Int. Cl.
  *H04W 36/22*   (2009.01)
  *H04W 36/32*   (2009.01)
(58) Field of Classification Search
  USPC .......................................................... 370/331
  See application file for complete search history.

(56) References Cited

U.S. PATENT DOCUMENTS

| | | | | |
|---|---|---|---|---|
| 8,611,900 | B2* | 12/2013 | Pandit | H04W 36/385 |
| | | | | 455/436 |
| 8,737,382 | B2* | 5/2014 | Moon | H04L 65/1069 |
| | | | | 370/352 |
| 9,516,521 | B2* | 12/2016 | Sirotkin | H04W 24/02 |
| 9,565,610 | B2* | 2/2017 | Ibrahim | H04W 36/30 |
| 9,596,622 | B2* | 3/2017 | Tian | H04L 47/125 |
| 9,998,921 | B2* | 6/2018 | Allanki | H04W 48/08 |
| 10,064,186 | B2* | 8/2018 | Naghshvar | H04W 72/0453 |
| 10,070,362 | B2* | 9/2018 | Kwan | H04W 24/10 |
| 10,390,299 | B2* | 8/2019 | Lin | H04W 48/20 |
| 10,412,769 | B2* | 9/2019 | Cherian | H04B 7/0417 |
| 10,484,451 | B2* | 11/2019 | Rao | H04W 4/24 |
| 10,498,502 | B2* | 12/2019 | Mildh | H04L 5/0096 |
| 10,568,060 | B2* | 2/2020 | Cattoni | H04W 60/04 |
| 10,616,940 | B2* | 4/2020 | Vutukuri | H04W 76/14 |
| 10,834,751 | B2* | 11/2020 | Yi | H04W 4/40 |
| 2003/0193910 | A1 | 10/2003 | Shoaib et al. | |
| 2007/0072563 | A1* | 3/2007 | Weaver | H04W 36/30 |
| | | | | 455/115.1 |
| 2008/0159232 | A1* | 7/2008 | Thalanany | H04W 36/0016 |
| | | | | 370/332 |
| 2009/0180439 | A1* | 7/2009 | Tabery | H04W 12/12 |
| | | | | 370/331 |
| 2013/0329639 | A1* | 12/2013 | Wietfeldt | H04W 88/06 |
| | | | | 370/328 |
| 2014/0171079 | A1 | 6/2014 | Yoon | |
| 2015/0280765 | A1* | 10/2015 | Lowery | H04L 67/306 |
| | | | | 455/558 |
| 2018/0368049 | A1* | 12/2018 | Patil | H04W 36/0061 |
| 2019/0037613 | A1* | 1/2019 | Anantharaman | H04W 12/06 |

\* cited by examiner

_US 11,350,332 B2_

METHOD FOR TRANSFERRING A MOBILE TERMINAL BETWEEN ACCESS STATIONS IN A MULTI-OPERATOR CONTEXT

RELATED APPLICATIONS

This application is the U.S. National Phase of Application No. PCT/FR2018/052427 entitled "METHOD FOR TRANSFERRING A MOBILE TERMINAL BETWEEN ACCESS STATIONS IN A MULTI-OPERATOR CONTEXT" and filed Oct. 2, 2018, which claims the benefit of French Patent Application No. 1759353, filed Oct. 5, 2017, each of which is incorporated by reference in its entirety.

1. FIELD OF THE INVENTION

The patent application lies in the field of mobile access networks in a context of cooperation between operators of mobile infrastructures controlling the access networks.

2. PRIOR ART

A mobile terminal is attached at a given instant to a base station of a mobile network controlled by an operator. A base station can be a BTS (Base Transceiver Station) station, a NodeB station, an eNodeB station or else any other type of station affording radio connection to a mobile terminal. In particular, it may entail a BBU (Base Band Unit) virtual entity or some other virtual or physical entity which manages an RRH (Remote Radio Head) entity in an architecture of C-RAN (Cloud Radio Access Networks) type. By virtue of this attachment, the mobile terminal, and therefore the user if this entails for example a smartphone, communicates with another terminal, fixed or mobile, attached to the same mobile network or to another network, of fixed or mobile type. The operator deploys base stations over a geographical area in such a way that a mobile terminal, when it is traveling around, can attach to one of the base stations deployed and benefit from good communication quality for data transmission. A "handover" mechanism is implemented to allow the terminal to transmit and receive data without interruption when the mobile terminal attaches successively to several base stations. According to the prior art techniques, when the mobile terminal is not traveling around, it has no reason a priori to attach to another base station, of the same operator or of a different operator. Furthermore, even if it had reason to do so, an operator of the network does not generally deploy multiple base stations for a given geographical area but aims rather at distributing the base stations over a territory so as to prevent so-called white geographical areas from not having any base station to which a mobile terminal, present in these white areas, can attach.

Thus, when a mobile terminal has poor connectivity in a mobile network of an operator, it is not generally possible for it to attach to another base station of the operator's network, either because it is outside the range of this other station or else because the handover techniques do not provide therefor. This problem relating to poor connectivity impacts the mobile terminal itself since the terminal's data bitrate is lower, its battery is impaired for low connection quality and operation of the applications on the mobile terminal suffer thereby. This poor connectivity also affects the operator of the mobile network since transmission capacities are used in an ineffective manner. Furthermore, the electromagnetic interactions are accentuated by the fact that the mobile terminal starts searching for higher-performance transmission channels, for example by using a larger transmission power, and the operator must furthermore place data in cache while waiting to be able to transmit them to the mobile terminal which may lie out of range.

With the aim of solving this problem, a solution based on cooperation of operators controlling distinct mobile networks appears beneficial. This type of cooperation, in particular described in the document "Why user swapping could be the best coordination mechanism in a cellular network?" (Globecom, Wireless Network Symposium, 2013), allows a mobile terminal for which the connection quality turns out to be of low performance to be transferred over to a base station of a mobile network controlled by another operator. This mechanism thus makes it possible to offer mobile terminals better connection quality and therefore to improve operators' geographical coverage by virtue of collaboration between operators present over the geographical area. This solution makes it possible as it were to extend the roaming possibilities to problems of connection quality and not only to problems of radio coverage. Roaming is indeed implemented so that an operator can benefit from radio coverage in a given geographical area, by virtue of other operators' networks, when the former does not itself have a radio network in this area. The roaming techniques furthermore assume that a terminal can attach to a base station of another operator by virtue of an agreement made between the operators guaranteeing a terminal the ability to attach to a base station of the other operator without taking into account the traffic conditions on the base station and without any condition other than the existence of a global agreement at the time the terminal connects.

Though the idea of cooperation between operators to ensure the connectivity of a mobile terminal is known, no method exists which makes it possible to carry out in a dynamic manner, and while taking into account the conditions relating to the flow of the data traffic, the transfer of a mobile terminal attached to a first base station to a second station controlled by a different operator.

The object of the present invention is to remedy drawbacks of the prior art.

3. DISCLOSURE OF THE INVENTION

The invention seeks to improve the situation with the aid of a method for transferring a mobile terminal attached to a first access entity of an operator to a second access entity of a set of access entities controlled by at least one other operator within a communication network, implemented by a control device for conveying data of the terminal, characterized in that it comprises:
  a step of receiving, originating from the entities of the set, a connectivity message comprising at least one parameter relating to the quality of transmission of the data between said terminal and each said entity,
  a step of determining an eligibility value relating to each entity, on the basis of the at least one parameter received and of a factor of cooperation between the first entity and each other access entity of the set,
  a step of selecting the second entity on the basis of the eligibility value determined,
  a step of sending, destined for the first entity and for the second entity, a transfer message comprising a transfer instruction and furthermore comprising an identifier of the first access entity and an identifier of the second access entity.

According to the proposed method, the transfer of a terminal from a first access entity, so-called origin entity, controlled by a first operator, to a second access entity, so-called destination entity, controlled by a different operator from the first, makes it possible to enable the terminal to be afforded better connectivity at this instant, and to do so even if the terminal is not moving. Furthermore, this transfer allows operators to control their access entities so as to avoid the latter becoming overloaded, in terms of connected terminals and volume of traffic. To implement the method, the terminal must be able to attach to a second access entity, that is to say be within range of a radio transmission of this access entity. Furthermore, attachment also assumes the terminal's ability to register with the second access entity, thus assuming an agreement between the two distinct operators controlling the two access entities. The agreement of the operator that controls the second access entity is obtained in a dynamic manner by virtue of the cooperation factor involved in determining an eligibility value, thus rendering the method more beneficial relative to a simple roaming technique used by the operators, where the agreement is not specific to a transfer such as proposed. Furthermore, on the basis of the eligibility values calculated for each access entity, the control device can note that the terminal must be transferred over to a second access entity. Indeed, if the control device determines that the quality of connection to the first access entity is not satisfactory, it decides to implement the transfer of the terminal over to the second access entity. The quality of the data transmission between the terminal and an access entity is advantageously used for selecting the second entity. An entity thus transmits an estimation of the quality of the channel for the terminal. If this entails the first entity, a real value of the quality of the channel can be transmitted to the control device. In particular the quality can be expressed by virtue of the SINR (Signal-to-Interference-plus-Noise Ratio) ratio widely used in radio networks and which can be used to estimate a value of eligibility to an access entity. This value used for example with an item of information about the load of the access entities and in addition to a cooperation factor, allows best choice of the entity to which the terminal will be transferred while reusing an indicator widely used by the various operators. Another option consists in the entities transmitting an estimated information item of CQI (Channel Quality Indicator) type or indeed both items of information, namely the SINR ratio and the CQI information item.

The eligibility value can therefore be based on a transmission parameter, such as a CQI or SINR value, and on a factor of cooperation between the operators controlling respectively the first and the second entity. The cooperation factor may for example be a binary value indicating effective or non-effective cooperation of the operators (1 if cooperation, 0 if no cooperation for this transfer). The cooperation factor can be an incremented (respectively decremented) value provided that a transfer between two entities of each operator has succeeded (respectively failed). The selection of the second access entity is carried out as a function of the eligibility values calculated for each entity to which the terminal can potentially attach. The control device may for example select the entity having the highest eligibility value. Once a second access entity is selected, the control device sends the transfer decision to the two entities concerned in the transfer. Thus, the first access entity learns that a terminal which is attached to it must be transferred to a second access entity and the item of information about this second access entity is communicated to the first access entity.

The item of information about the second access entity can be an IP (Internet Protocol) address, a name of FQDN (Fully Qualified Domain Name) type or any other item of information allowing the first access entity to know, or indeed to invoke, the second access entity for the effective implementation of the transfer. The second access entity also receives the transfer message so as in particular not to reject the attachment request of the terminal when the latter attaches to it. The effective transfer of the terminal to the second access entity is carried out in accordance with the 3GPP (3rd Generation Partnership Project) known "handover" techniques.

According to one aspect of the invention, the transfer method furthermore comprises a step of receiving, originating from the first and from the second entity, an indication message comprising a datum acknowledging the transfer.

The first entity and the second entity can advantageously transmit an indication message to the control device, thus informing the control device that the transfer of the terminal has been executed in accordance with the transfer message received. The control device can use this message for example to update the factor of cooperation between the two operators controlling the two access entities. Indeed, a successful transfer makes it possible to give an indication about a successful cooperation between the two operators, it being possible for this indication to be exploited by the control device in respect of the forthcoming transfers to be managed.

According to another aspect of the invention, the indication message of the transfer method furthermore comprises the at least one parameter, updated following the transfer, in respect of data transmission between said terminal and each of the two access entities.

In addition to the acknowledgment datum, the first and the second access station transmit their respective data transmission parameters, updated following the transfer, thus allowing the control device to update the information about the access stations of the set. The control device can thus for example know the number of connected terminals, the available transmission channels and the information of CQI type. These parameters can be used by the control device during a future transfer to be managed.

According to another aspect of the invention, the transfer method furthermore comprises a step of sending by the control device, destined for each of the two entities, a message of updating of their eligibility value following the transfer.

Once the transfer has taken place and the control device has calculated a new eligibility value for each access entity, taking into account the information transmitted by the access entities as well as the updated cooperation factor, it transmits it to the two entities. This dispatch enables these two entities to thereafter be able to manage mobilities of terminals in an autonomous manner, without resorting systematically to a centralized control device. If each access entity has the updated eligibility value at its disposal, they can manage transfers between themselves, without invoking the centralized control device, thus saving resources of this device and the transmission networks.

According to another aspect of the invention, the transfer method furthermore comprises a step of receiving, originating from the terminal, an information message comprising at least one communication datum.

In addition to the transmission parameters transmitted by the various entities of the set, the control device receives an information message from the terminal, this message comprising data for communication, which can be used in a complementary manner, to the parameters received from the access entities. These data are used by the control device to improve the determination of the eligibility value and consequently, to better select the second access entity. In particular, the terminal can transmit information, such as noted by the terminal, in respect of send and receive bitrate, which information may be different from the bitrate parameters transmitted by the access entities (for example the number of PRBs (Physical Resource Block) allocated in a given period).

According to another aspect of the invention, the information message of the transfer method furthermore comprises a parameter of geographical positioning of the terminal.

The information message transmitted by the terminal comprises in particular a geographical positioning parameter which the control device exploits to determine the eligibility values associated with the access entities by taking into account in an enhanced manner the position of the terminal. In the absence of such a parameter, the control device can only use location information originating from the access entities, which do not know in a precise manner the location of the terminals that are attached to them. By virtue of this item of information, the second access entity selected will be better positioned with respect to the effective geographical location of the terminal. The element may for example be a GPS (Global Positioning System) datum.

According to another aspect of the invention, in the transfer method, the connectivity message furthermore comprises a datum about the load of the entity.

One of the parameters used by the control device for the determination of the eligibility value is the load of each access entity, which may correspond to the number of terminals simultaneously attached to each access entity or else to the total bitrate of the communications of the terminals attached to each access entity at a given moment. It may also entail two items of information (number of terminals and bitrate). This item of information is particularly relevant, on the one hand in the decision making to transfer a terminal from a first access entity to a second access entity and on the other hand for selecting the second access entity to which the terminal is transferred. This item of information is not considered in the cases of roaming between two access entities controlled by one and the same operator, according to the prior art techniques, and turns out to be particularly useful for better distributing the traffic on the access entities of a set of entities located in a geographical area.

According to another aspect of the invention, the transfer message of the transfer method furthermore comprises an item of information relating to the duration of the transfer.

It may be beneficial to the operators to limit the duration for which a terminal initially attached to the first access entity can attach to a second access entity of another operator. Indeed, the terminals attaching to the second access entity according to the method use resources that the terminals having a contract with the operator controlling the second entity may not use. The clients of the operator controlling the second entity could therefore suffer as a result of overly great use of the resources of the second entity, which could require their own transfer to an entity of a second operator, increasing the number of transfers and the management of these associated transfers by the control server. Limiting the duration of transfer therefore makes it possible to limit the consumption of the resources of the destination entity, controlled by the other operator. If the transferred terminal needs a larger duration of transfer than the duration fixed, a new transfer can be effected.

According to another aspect of the invention, in the transfer method, the cooperation factor is determined as a function of earlier transfers.

The cooperation factor is updated regularly to exploit the successful transfers as well as the transfers that have failed. Thus, knowing that the transfers are implemented in a dynamic manner so as to take account of the transmission parameters and also of the interactions between the operators, the learning technique is significant. The control device, by taking account of the past transfers, and of their past successes or failures, can take transfer decisions that have more chances of success. Indeed, if for diverse reasons, and in spite of transmission capacities available on access entities controlled by a given operator, failures of transfer to an access entity of an operator are recorded, the device will be able to unfavorably weight a cooperation with such an access entity for the future transfers.

According to another aspect of the invention, in the transfer method, the set of access entities is situated in a geographical area delimited as a function of the geographical location of the first entity.

The method is implemented to allow the transfer of the terminal to an access entity within radio transmission range of the terminal. It may therefore be necessary to circumscribe the area within which an access entity can actually be selected. This circumscription can be performed on the basis of geographical datum of the first access station, to which the terminal is initially attached, or on the basis of the location of the terminal. This item of information in respect of location of the first access station can be obtained in the connectivity message or else be obtained on the basis of an identifier of the access station transmitting the connectivity message. The control device can thus use a database to determine the geographical location of the first access entity on the basis of the identifier received. A database can also be used to obtain the area of circumscription of the first access entity and the set of the access entities of the area.

According to another aspect of the invention, in the transfer method, the connectivity message furthermore comprises a network slice identifier.

The transfer between two access entities can also depend on the network slice to which the terminal is attached. In this case a transfer will be able to take place only to an access entity also supporting the network slice in such a way that there is no break in communication and that the terminal does not lose any data during the transfer. In this case it is necessary that the control device obtains the network slice identifier so as to integrate it with the determination of the eligibility value and therefore with the selection of an access entity compatible with the network slice to which the terminal is attached.

The various aspects of the transfer method which have just been described can be implemented independently of one another or in combination with one another.

The invention also relates to a device for transferring a mobile terminal attached to a first access entity of an operator to a second access entity of a set of access entities controlled by at least one other operator within a communication network, characterized in that it comprises:
  a receiver, intended to receive, originating from the entities of the set, a connectivity message comprising at least one parameter relating to the quality of transmission of the data between said terminal and each said entity,
  a determination module, intended to determine an eligibility value relating to each entity, on the basis of the at least one parameter received and of a factor of cooperation between the first entity and each other access entity of the set, a selection module, intended to select the second entity on the basis of the eligibility value determined, a sender, intended to send, destined for the first entity and for the second entity, a transfer message comprising a transfer instruction and furthermore comprising an identifier of the first access entity and an identifier of the second access entity.

This device, able to implement in all its embodiments the transfer method which has just been described, is intended to be implemented in a server which is independent of the operators or in a device which is controlled by one of the operators.

The invention also relates to a transfer system comprising:
a control device comprising a transfer device,
a first access entity of an operator,
a second access entity controlled by another operator.

The invention also relates to a computer program comprising instructions for the implementation of the steps of the transfer method which has just been described, when this program is executed by a processor.

This program can use any programming language, and be in the form of source code, object code, or of code intermediate between source code and object code, such as in a partially compiled form, or in any other desirable form.

The invention is also aimed at an information medium readable by a computer, and comprising instructions of the computer program such as mentioned hereinabove.

The information medium can be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded over a network of Internet type.

Alternatively, the information medium can be an integrated circuit in which the program is incorporated, the circuit being adapted to execute or to be used in the execution of the method in question.

4. PRESENTATION OF THE FIGURES

Figure 2:
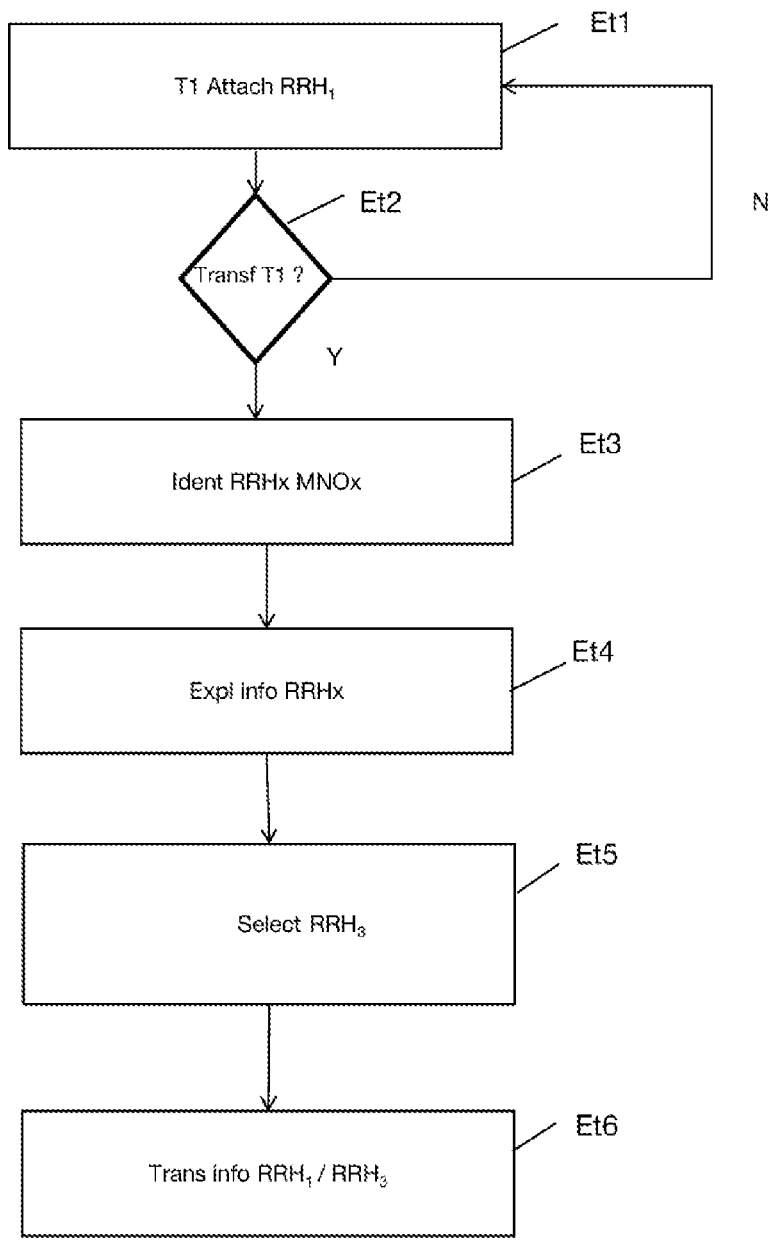
Figure 3:
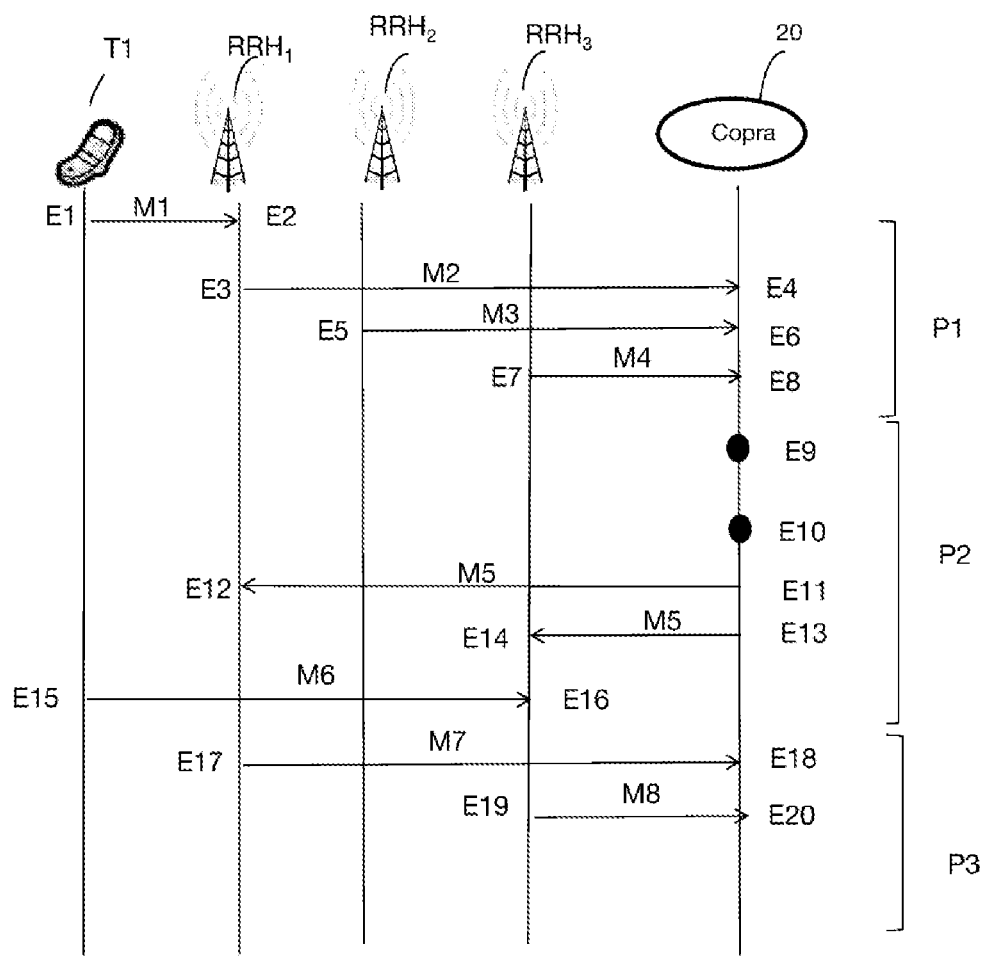
Figure 4:
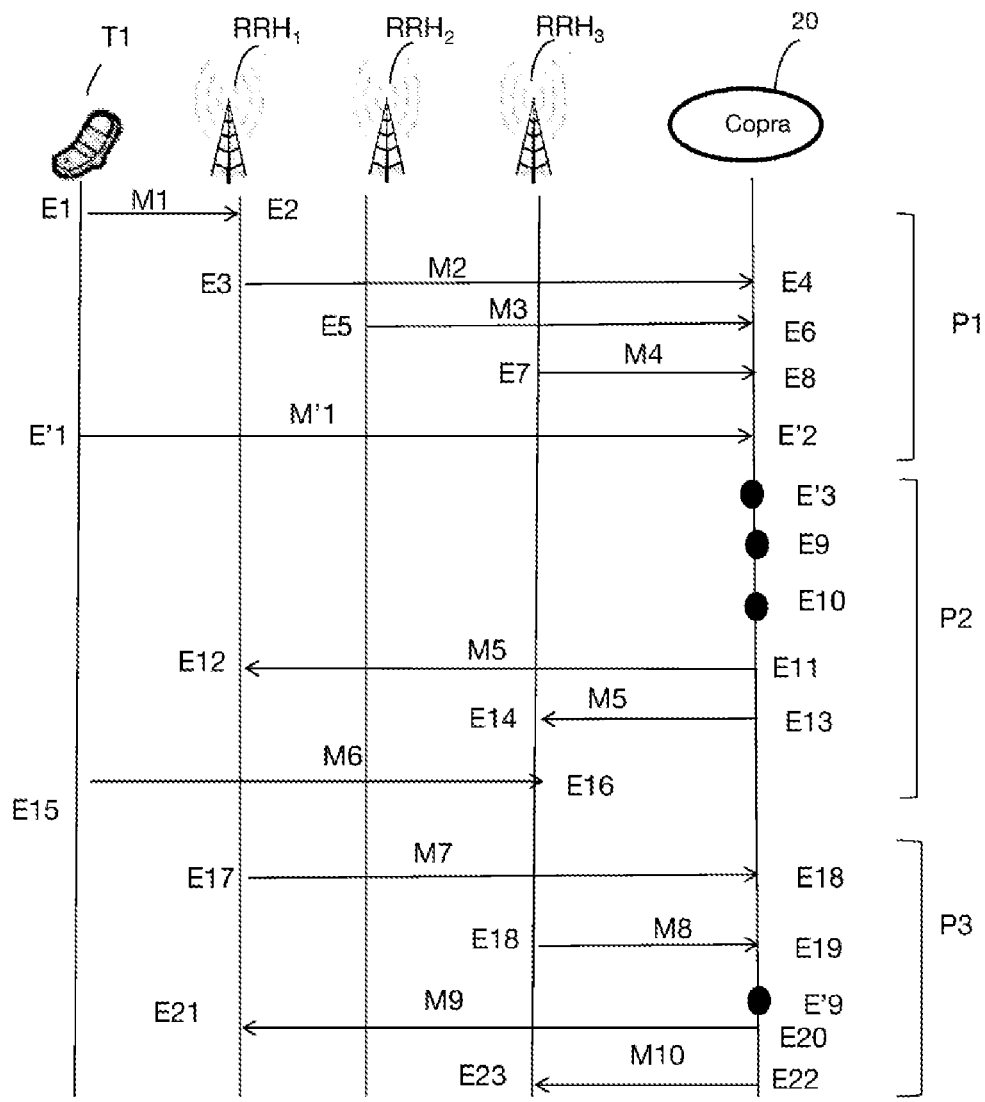
Figure 5:
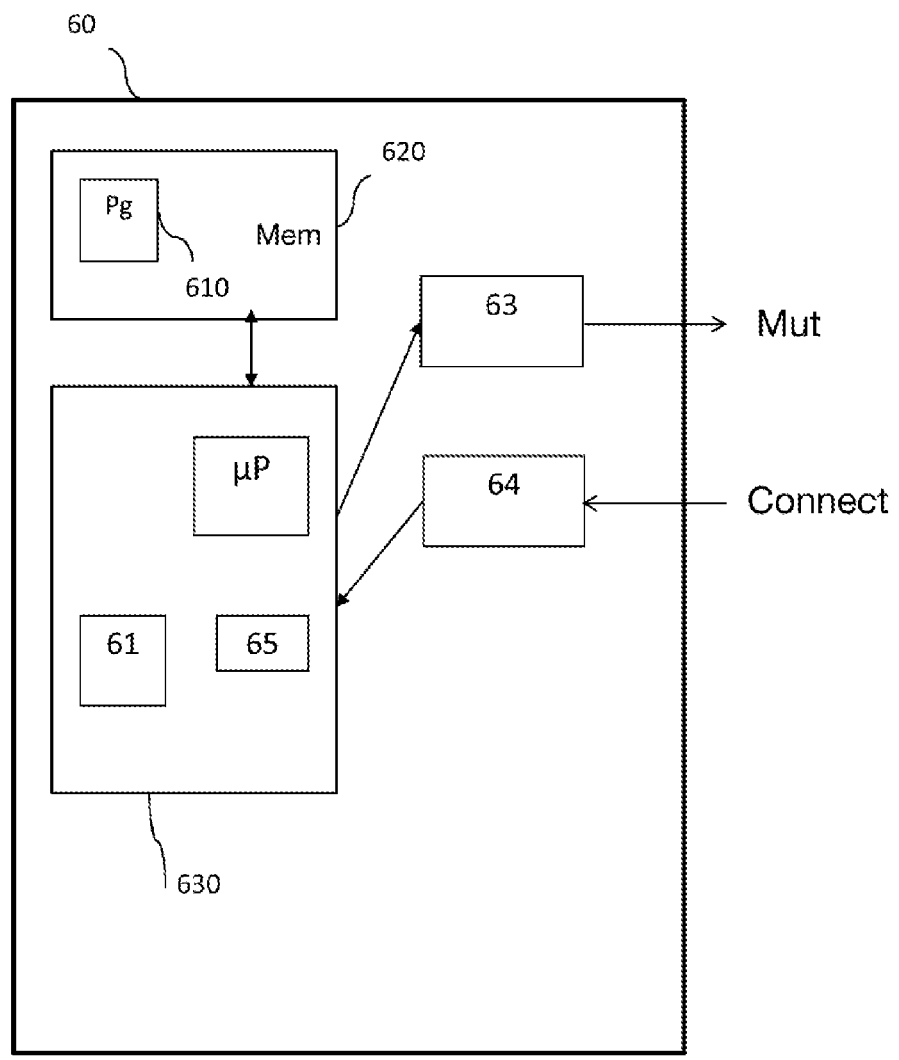

Other advantages and characteristics of the invention will be more clearly apparent on reading the following description of a particular embodiment of the invention, given by way of simple illustrative and nonlimiting example, and the appended drawings, among which:

FIG. 1 presents a simplified view of an architecture in which the transfer method according to one embodiment is implemented, FIG. 2 presents the various steps of the transfer method according to one aspect of the invention, FIG. 3 presents an outline of the transfer method according to a first embodiment of the invention, FIG. 4 presents an outline of the transfer method according to a second embodiment of the invention, FIG. 5 presents an exemplary structure of a transfer device according to one aspect of the invention.

5. DETAILED DESCRIPTION OF AT LEAST ONE EMBODIMENT OF THE INVENTION

Hereinafter in the description, examples are presented of several embodiments of the invention in a generic mobile communication infrastructure. The invention can in particular be implemented in a mobile communication infrastructure specified within the 3GPP organization, such as so-called 3G (Third Generation), 4G (Fourth Generation), 5G (Fifth Generation) networks as well as mobile networks based on technologies based on the specifications of the IEEE organization (Institute of Electrical and Electronics Engineers).

Reference is firstly made to FIG. 1 which presents a simplified view of an architecture in which the transfer method according to one embodiment is implemented.

A global communications network 100, which can be a mobile infrastructure of any generation, to which a terminal T1 connects. The global network 100 consists of a set of networks controlled by different operators. In FIG. 1, the networks 101, 102, 103 respectively controlled by the operators MNO1, MNO2 and MNO3 form part of the global network 100. The network 101 comprises access stations, also called access entities. These access entities can be BTS equipments, eNodeB equipments, or 5G radio access equipments. The networks 101 comprises the access entities $RRH_1$ and $RRH_{11}$, the network 102 comprises the access entity $RRH_2$ while the network 103 comprises the access entities $RRH_3$ and $RRH_{31}$. There does not exist a priori any limitation as regards the number of access entities in an operator network and as regards the number of operator networks in a global communication network. Reference is made to access entities of RRH type. They may also be RRH+BBU entities, it being possible for the BBU device to be co-located with the RRH antenna or else to be more centralized. For simplicity, hereinafter in the text, the term RRH will be used even though an access entity may be an RRH and a BBU.

The networks 101, 102, 103 controlled by different entities, according to the prior techniques, do not collaborate for the provision of connectivity to the terminal T1. Indeed, operators usually collaborate through the establishment of roaming agreements making it possible to ensure a larger spatial coverage for the terminals. By virtue of these agreements, a terminal can thus obtain connectivity by attaching to a network controlled by an operator with which the user of the terminal has not contractualized an offer. In the architecture of FIG. 1, the 3 operators MNO1, MNO2 and MNO3 do not have a priori a predefined agreement and the terminal T1 is under the radio coverage of the 3 operators, that is to say that it can in a radio coverage area of the access entities of each network 101, 102, 103. In the communication network 100, a control server 20 is deployed. The object of this server 20 is to manage the connectivity of the terminal T1 in such a way that it benefits from the best quality of data transmission. The server 20 therefore interacts with the access entities of the various communications networks 101, 102, 103 and also, optionally, with the terminal T1. The server 20 can be managed by one of the three operators MNO1, MNO2, MNO3 or else be managed by a distinct entity separate from these three operators. The terminal T1 is initially attached to the access entity $RRH_1$. The attachment of the terminal 1 causes the terminal to be identified and authenticated by the entity $RRH_1$ or else by another device of the network 100, for example by the "Attach Request" message dispatch transmitted to the station $RRH_1$ and retransmitted to a device of MME (Mobility Management Entity) or SGSN (Serving GPRS Support Node) type. The server 20 exchanges information, in a regular manner, with the access entities $RRH_1$, $RRH_{11}$, $RRH_2$, $RRH_3$, $RRH_{31}$ or indeed also with the terminal T1. By virtue of the messages exchanged, the server 20 decides to transfer the terminal T1 over to another access entity $RRH_3$ controlled by the operator MNO3. The transfer occurs without there being any break in communication for the terminal T1 and independently of the fact that the terminal T1 is or is not in a mobility situation. Furthermore, it is not necessary for there to be a predefined agreement between the operators MNO1 and MNO3.

In conjunction with FIG. 2, the various steps of the transfer method according to one aspect of the invention are presented. The steps described in FIG. 2 are implemented by the control server 20, such as described in FIG. 1.

During a step Et1, the control server 20, such as described in FIG. 1, is aware that the terminal T1 is attached to an access entity $RRH_1$. The control server 20 learns this following the dispatching by the entity $RRH_1$ to the server 20 of a connectivity message comprising the identity of the terminals that are connected to it and diverse parameters among which is the SINR ratio associated with each attached terminal. The connectivity message is transmitted in a regular manner, that is to say at regular intervals, by each entity RRH for which the server 20 implements the transfer method.

During step Et2, the server detects that the terminal T1 does not benefit from sufficient communication quality. This detection is effected on the basis of a connectivity message received from the entity T1 and indicating that the SINR ratio is below a predefined threshold. The server 20 evaluates, upon each receipt of a connectivity message, whether the ratio for the terminal T1 is sufficiently good, in which case it does not transfer the terminal, or else too poor, thus requiring a transfer.

During step Et3, the server 20 determines a set of access entities to which the terminal T1 is liable to be able to attach within the framework of the transfer method. To determine the entities, the server 20 can use information transmitted by the entity $RRH_1$. For example, it can use an item of information in respect of location of the entity $RRH_1$ or an identifier of the entity $RRH_1$ which it utilizes to obtain its geographical location. The server 20 can also receive a message from the terminal T1, the message comprising an item of information in respect of location allowing it to thereafter identify the access entities within range of the terminal T1, that is to say whose radio waves can be received from the terminal T1.

During step Et4, the server 20 utilizes the information transmitted by the entities RRH of the set in the connectivity messages respectively transmitted by each entity RRH. The server 20 furthermore utilizes the information relating to the cooperation between the operators taking part in the method. In the case where the three operators MNO1, MNO2 and MNO3 take part in the method for transferring the terminal T1, the server uses the factor of cooperation between on the one hand the access entity of the operator MNO1 and each access entity, controlled by MNO2, of the set and on the other hand between the access entity of the operator MNO1 and each access entity, controlled by the operator MNO3, of the set. This factor may for example be a percentage of successful transfers between the respective entities of the two operators in a past time interval or else an indicator transmitted by a management entity, the indicator taking into account the various interactions between the two operators (roaming, partnerships, transfers . . . ) in addition to the interactions between the entities themselves.

During step Et5, the server 20 selects an entity RRH, in the present case the entity $RRH_3$, from among the set of the entities in radio range, by taking into account the factor of cooperation between the entities and the data transmitted in the connectivity messages received from each entity. In particular, the item of information about the load of the access entity, represented by the number of simultaneously connected terminals or the total bitrate of all the terminals attached to an access entity, is significant. The objective is to improve the bitrate of the terminal T1 and consequently the Quality of Experience, by virtue of taking the factor of cooperation between entities into account.

During step Et6, the server 20 transmits to the two entities concerned in the transfer, namely the entity $RRH_1$ and the entity $RRH_3$, a transfer message comprising in particular the identifiers of the entities $RRH_1$ and $RRH_3$. Thus, the entity $RRH_1$ can implement the effective transfer of the terminal T1, for example by transmitting a message to the terminal T1 indicating to it that it must attach to the entity $RRH_3$. The entity $RRH_3$, by virtue of the transfer message received, is informed that the terminal T1 will request an attachment request and will be able to continue the attachment procedure when it receives such a request. The transfer message can also comprise an authentication key making it possible to implement enhanced security in the transfer method. The effective transfer of the terminal T1 from the entity $RRH_1$ to the entity $RRH_3$ occurs without invoking the server 20.

Reference is now made to FIG. 3 which presents an outline of the transfer method according to a first embodiment of the invention.

The transfer method proceeds according to three phases named P1, P2, P3 in FIG. 3. Phase P1 corresponds to a phase of initialization of the transfer. Phase P2 corresponds to a phase of execution of the transfer while phase P3 corresponds to the phase of acknowledgment of the transfer which can also be considered to be a learning phase.

Phase P1 commences at step E1 where the terminal T1 attaches to the entity $RRH_1$ by dispatching a message M1 to the entity $RRH_1$. The entity $RRH_1$ receives the message M1 during step E2. The attachment of the terminal T1 is not described in detail and includes, in particular, exchanges related to the authentication, to the configuration and to the allotting of a transmission channel to the terminal T1, these exchanges possibly requiring the contribution of devices of the mobile network in addition to the entity $RRH_1$. During phase P1, the various entities $RRH_1$ controlled by the operator MNO1, $RRH_2$ controlled by the operator MNO2, $RRH_3$ controlled by the operator MNO3 and contributing to the transfer method transmit, during the respective steps E3, E5, E7, connectivity messages M2, M3, M4 to a control device 20 in charge of managing the transfers between the various entities. The operators MNO1, MNO2, MNO3 manage several entities each as is indicated in FIG. 1, but for the sake of simplification, a single entity per operator is represented in FIG. 3. In particular, the entities $RRH_{11}$ and $RRH_{31}$ are not represented. These connectivity messages are respectively received by the device 20 during steps E4, E6, E8. It should be noted that the messages M2, M3, M4 can be transmitted at regular intervals to the device 20 in such a way that the real transfer conditions are taken into account for the transfer. The messages M2, M3, M4 comprise for example parameters about the load of the access entities, such as the number of simultaneously attached terminals, the aggregate bitrate of data of the attached terminals. The messages M2, M3, M4 also comprise information relating to the radio quality of the transmission channels of the entities $RRH_1$, $RRH_2$, $RRH_3$, such as the SINR ratios of the attached terminals. The initialization phase P1 has terminated.

Phase P2 begins when the server 20, during step E9, analyzes the data received and calculates eligibility values associated with each entity $RRH_1$, $RRH_2$, $RRH_3$. These eligibility values are calculated on the basis of the parameters present in the messages M2, M3, M4 received and in particular the information in respect of quality of service and load of each entity $RRH_1$, $RRH_2$, $RRH_3$. The eligibility values take into account furthermore a factor of cooperation between the various entities $RRH_1$, $RRH_2$, $RRH_3$. The server 20, according to an example, logs a history of the transfers carried out in the past and calculates a cooperation factor which is the ratio of the number of successful transfers between two access entities relative to the number of transmitted transfers. According to another example, the cooperation factor takes into account the ratio of the number of transferred terminals that are controlled by an operator, relative to the total number of terminals managed by this operator. The eligibility value associated with each entity is in particular updated as a function of the connectivity messages received and of the transfers implemented.

During step E10, the server 20 detects that the terminal T1 must be transferred over to another entity and selects the entity $RRH_3$. The detection can be carried out as a function of the message M2 received from the entity $RRH_1$. According to an example, the server 20 detects that the SINR ratio for the terminal T1 on the entity $RRH_1$ is below a threshold considered to be acceptable or else that the entity $RRH_1$ has an overly large number of attached terminals relative to the neighboring entities, and the server 20 considers that some terminals must be transferred. The selection of the terminals to be transferred is specific to the server and the latter can, according to an example, select the terminals having a lower quality of transmission. The selection of the entity $RRH_3$ in order to transfer the terminal T1 is carried out as a function of the eligibility thresholds determined during step E9. The entity $RRH_3$ having a better eligibility value than $RRH_2$, the server 20 selects $RRH_3$. According to an alternative, the server 20 considers a subset of entities for the selection. In the case where the server 20 receives connectivity messages from entities distributed over a wide territory, it can define a geographical area within which it selects the destination entity $RRH_3$. The geographical area can be defined, according to an example, as a function of an identifier or of the geographical position of the entity $RRH_1$. If this entails an identifier, the server 20 must associate a geographical location with the identifier for example by resorting to a database matching the identifiers of the entities with their geographical positions.

Once the entity $RRH_3$ has been selected, the server 20 transmits during steps E11 and E13 a transfer instruction message M5 to the entities $RRH_1$ and $RRH_3$, comprising the identifier of the terminal T1 as well as the identifiers of the source entity $RRH_1$ and of the destination entity $RRH_3$.

The transfer instruction may optionally comprise an indication of duration for which the transfer is effective. This can correspond for example to a maximum duration of validity at the end of which the transfer will come to an end, that is to say at the end of which the terminal T1 will no longer be attached to the entity $RRH_3$. This indication of duration can be a constant value or can depend on the number or on the duration of the transfers carried out previously, possibly between the two entities of the operators concerned in the transfer in progress. The objective of this indication of duration is to limit the duration for which a transfer of a terminal is effective in such a way that the operators may prevent the possibility of their resources being used for too long by other operators' terminals.

On receipt of the message M5, the entities $RRH_1$ and $RRH_3$ implement the effective transfer of the terminal T1. This transfer comprises for example the dispatching of an instruction of attachment to the entity $RRH_3$, transmitted by the entity $RRH_1$ to the terminal T1 and the dispatching of a detachment instruction dispatched by the entity $RRH_1$ or else by the entity $RRH_3$ to the terminal T1, once the terminal is attached to the entity $RRH_3$. The terminal T1 thus attaches to the entity RRH3 by transmitting to the entity $RRH_3$ a message M6 of attachment during step E15. The entity $RRH_3$ receives the attachment message M6 during step E16. This step brings an end to phase P2.

Phase P3 corresponds to the dispatching of an indication message M7 and M8 by the entities $RRH_1$ and $RRH_3$ during steps E17 and E19, acknowledging that the transfer of the terminal T1 has been carried out. These messages M7 and M8 can, according to an example, comprise information relating to the load of the entities and quality-of-service parameters, updated following the transfer. The server 20, when it receives the messages M7 and M8 during steps E18 and E20, can advantageously update the cooperation factor or indeed also the load information and quality-of-service information relating to the entities $RRH_1$ and $RRH_3$. The server 20 can thus determine a new eligibility value, following the successful transfer of the terminal, that it can utilize for the forthcoming transfers to be managed between the two entities.

Reference is now made to FIG. 4 which presents an outline of the transfer method according to a second embodiment of the invention.

The steps presented in FIG. 3 are also valid for the embodiment described in FIG. 4. This embodiment furthermore comprises the following steps.

During phase P1, the terminal T1 transmits during step E1 an information message M'1 comprising data relating to the attachment of the terminal T1 to the entity $RRH_1$. In particular, the message M'1 can comprise an item of information in respect of geographical location of the terminal T1, such as a GPS datum, as well as a data bitrate actually noted by the terminal T1. The data transmitted by the terminal T1 in the message M'1 are exploited by the server 20, on receipt of the message M'1 during step E'2, for the execution of steps E'3 (described hereinafter), E9, E10 of phase P2.

The messages M2, M3, M4 and M'1 furthermore comprise a network identifier or network slice identifier, a network slice comprising specific functions for conveying and processing data, usually virtualized, on one and the same physical infrastructure for needs related to the type of terminal, of application, or of clients. Thus applications or terminals having close traffic characteristics (latency, quality, security . . . ) will use an identical network slice. This item of network or network slice information can thereafter be used by the server 20 to select an entity also supporting the network slice indicated in the messages M2, M3, M4, M'1 received. According to an example, the server 20 significantly weights the network slice identifier in the determination of the eligibility value so as to retain only an entity supporting the network slice.

A phase E'3 is added to phase P2 described in the embodiment of FIG. 3 and corresponds to the determination of a group of entities as a function of the geographical location item of information transmitted by the terminal in the message M'1. This item of information is advantageously used since it allows the server 20 to consider entities positioned as a function of the terminal T1 and not only as a function of the entity $RRH_1$. Taking into account the location item of information originating from the terminal T1 makes it possible to decrease the number of transfer failures because of a problem of accessibility of the terminal T1 to entities which are indicated by the server 20 but possibly out of range of the terminal T1 because of radio propagation problems in particular.

In this embodiment, phase P3 is also modified with respect to the embodiment described in FIG. 3. Indeed, on receipt of the messages M7 and M8, the server 20 calculates during step E'9 an eligibility value for each entity involved in the transfer, namely the entity $RRH_1$ and the entity $RRH_3$, as a function of the messages M7 and M8 received. This embodiment is furthermore distinguished from the first embodiment by the sending during step E20 of a message M9 to the entity $RRH_1$ its new eligibility value. The server 20 also transmits to the entity $RRH_3$, during step E22, its eligibility value recalculated following the transfer, in a message M10. These two messages M9 and M10 are respectively received by the entities $RRH_1$ and $RRH_3$ during steps E21 and E23. The knowledge of these values enables the entities $RRH_1$ and $RRH_3$ themselves to be able to manage forthcoming transfers between each other without necessarily resorting to the intervention of the server 20. If one of the entities $RRH_1$ or $RRH_3$ is aware of a load problem, it can invoke the other RRH entity and perform a transfer of one or more terminals without resorting to the intervention of the server 20. In this embodiment, the entities can thus themselves manage transfers making it possible to thus reduce the load relating to the signaling traffic heading for the server 20 or else to be able to ensure transfers when the server 20 is off-service.

In conjunction with FIG. 5, an exemplary structure of a transfer device according to one aspect of the invention is presented.

The transfer device 60 implements the transfer method, various embodiments of which have just been described.

Such a device 60 can be implemented in a (physical or virtual) access entity or in a device which is more centralized in an autonomous manner, that is to say by using a specific equipment, or integrated with a device of a mobile infrastructure.

For example, the device 60 comprises a processing unit 630, equipped for example with a microprocessor µP, and driven by a computer program 610 stored in a memory 620 and implementing the transfer method according to the invention. On initialization, the code instructions of the computer program 610 are for example loaded into a RAM memory, before being executed by the processor of the processing unit 630.

Such a device 60 comprises:
a receiver 64, intended to receive, originating from the entities of the set, a connectivity message Connect comprising at least one parameter relating to the quality of transmission of the data between said terminal and each said entity,
a determination module 61, intended to determine an eligibility value relating to each entity, on the basis of the at least one parameter received and of a factor of cooperation between the first entity and each other access entity of the set,
a selection module 65, intended to select the second entity on the basis of the eligibility value determined,
a sender 63, able to send, destined for the first entity and for the second entity, a transfer message Mut comprising a transfer instruction and furthermore comprising an identifier of the first access entity and an identifier of the second access entity.

The transfer method turns out to be particularly useful for providing clients with good-quality connectivity to an infrastructure while limiting the associated costs for operators.

The method nonetheless assumes agreements, which may be temporary, between the operators. In particular, in case of failure of an operator network in a given geographical area, the clients having a contract with the operator in question will nonetheless be able to access their communication services by using the resources of another operator, if the other operator accepts, including temporarily, the attachments of these clients which are a priori "foreign" to it. The transfer method can furthermore be enriched by allowing an operator to limit accesses of the clients of other operators to specific services and/or to predefined timeslots. This allows an operator on the one hand to limit the use of its infrastructure to services which for example consume few technical resources and on the other hand to apply different policies according to the time of the day, of the week or of the month. The method can be implemented between operators of various types. In particular it may entail operators of telecommunications infrastructure networks and also operators ensuring the management of networks of smaller size, such as hot spots deployed in shops, railroad stations, airports or indeed in clients' residences. It is possible furthermore to envisage that the transfer of a terminal from one entity to another entity is effective for one application, if the streams are transported on a specific network slice for example, and that the streams of another application remain conveyed by the first access entity. The terminal would thus be attached simultaneously to two access entities controlled by two different operators.

The invention claimed is:

1. A method for transferring a mobile terminal attached to a first access entity of a first operator to a second access entity of a set of access entities controlled by at least one other operator within a communication network (100), the method implemented by a control device for conveying data of the terminal, the method comprising:
receiving a connectivity message originating from the access entities of the set of access entities, the connectivity message comprising at least one parameter relating to the quality of transmission of the data between the terminal and each of the access entities,
determining an eligibility value relating to each access entity on the basis of the at least one parameter received and of a factor of cooperation between the first access entity and each of the other access entities of the set of access entities, the factor of cooperation being determined as a function of earlier transfers,
selecting the second entity on the basis of the determined eligibility value,
sending a transfer message, the transfer message destined for the first access entity and for the second access entity, the transfer message comprising:
a transfer instruction;
an identifier of the first access entity; and
an identifier of the second access entity.

2. The transfer method of claim 1, further comprising receiving an indication message, originating from the first access entity and from the second access entity, the indication message comprising a datum acknowledging the transfer.

3. The transfer method of claim 2, wherein the indication message further comprises the at least one parameter, updated following the transfer, with respect to data transmission between the terminal and each of the two access entities.

4. The transfer method of claim 1, further comprising sending an update message by the control device, the update message destined for each of the two access entities, the update message updating the eligibility value of the two access entities following the transfer.

5. The transfer method of claim 1, further comprising receiving an information message, the information message originating from the terminal, the information message comprising at least one communication datum.

6. The transfer method of claim 5, wherein the information message further comprises a parameter of geographical positioning of the terminal.

7. The transfer method of claim 1, wherein the connectivity message further comprises a datum indicative of the load of the access entity.

8. The transfer method of claim 1, wherein the transfer message further comprises an item of information relating to the duration of the transfer.

9. The transfer method of claim 1, wherein the set of access entities is situated in a geographical area delimited as a function of the geographical location of the first entity.

10. The transfer method of claim 1, wherein the connectivity message further comprises a network slice identifier.

11. A computer comprising a processor and a memory, the memory having stored thereon instructions which, when executed by the processor, cause the computer to implement the transfer method of claim 1.

12. A non-transitory computer readable medium having stored thereon instructions which, when executed by a processor, cause the processor to implement the method of claim 1.

13. A device, the device configured to transfer a mobile terminal attached to a first access entity of a first operator to a second access entity of a set of access entities controlled by at least one other operator within a communication network, the device comprising a processor and a memory, the device configured to:

receive a connectivity message originating from the access entities of the set of access entities, the connectivity message comprising at least one parameter relating to the quality of transmission of the data between the terminal and each of the access entities, determine an eligibility value relating to each of the access entities, on the basis of the at least one parameter received and of a factor of cooperation between the first access entity and each of the other access entities of the set of access entities, the factor of cooperation being determined as a function of earlier transfers, select the second access entity on the basis of the determined eligibility value, send a transfer message, the transfer message destined for the first entity and for the second entity, the transfer message comprising:
a transfer instruction,
an identifier of the first access entity, and
an identifier of the second access entity.

14. A transfer system comprising:
a control device comprising the transfer device of claim 13,
the first access entity of the first operator, and
second access entity controlled by another operator.

* * * * *